United States Patent
Ryu et al.

(10) Patent No.: US 8,589,647 B2
(45) Date of Patent: Nov. 19, 2013

(54) APPARATUS AND METHOD FOR SYNCHRONIZING A SNAPSHOT IMAGE

(75) Inventors: Jae-Min Ryu, Suwon-si (KR); Sang-Bum Suh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 352 days.

(21) Appl. No.: 12/983,693

(22) Filed: Jan. 3, 2011

(65) Prior Publication Data

US 2011/0307674 A1 Dec. 15, 2011

(30) Foreign Application Priority Data

Jun. 15, 2010 (KR) .................. 10-2010-0056770

(51) Int. Cl.
*G06F 12/00* (2006.01)
(52) U.S. Cl.
USPC .......................................... 711/162
(58) Field of Classification Search
None
See application file for complete search history.

(56) References Cited

U.S. PATENT DOCUMENTS

| | | | |
|---|---|---|---|
| 6,073,226 A * | 6/2000 | Cutshall et al. | 711/203 |
| 6,205,450 B1 * | 3/2001 | Kanome | 707/649 |
| 7,296,125 B2 | 11/2007 | Ohran | |
| 7,440,966 B2 | 10/2008 | Adkins et al. | |
| 7,644,302 B2 * | 1/2010 | Kambara et al. | 714/6.11 |
| 7,694,087 B2 | 4/2010 | Soeda | |
| 2009/0249119 A1 | 10/2009 | Sethumadhavan et al. | |
| 2010/0106754 A1 * | 4/2010 | Condit et al. | 707/822 |

FOREIGN PATENT DOCUMENTS

| | | |
|---|---|---|
| JP | 4225206 | 12/2008 |
| JP | 4256851 | 2/2009 |
| JP | 2009-238227 | 10/2009 |
| KR | 10-2004-0071693 | 8/2004 |
| KR | 10-2006-0122677 | 11/2006 |
| KR | 10-2009-0106421 | 10/2009 |
| WO | WO 2005/086032 | 9/2005 |
| WO | WO 2009/107507 | 9/2009 |

* cited by examiner

*Primary Examiner* — Hiep Nguyen
(74) *Attorney, Agent, or Firm* — NSIP Law (57) ABSTRACT

An apparatus and method for synchronizing a snapshot image are provided. A synchronization page is detected based on whether a page fault is generated in a snapshot page that is part of a snapshot image and based on attributes of a process that generated the page fault. The detected synchronization page is reflected in the snapshot image at a specific time.

22 Claims, 8 Drawing Sheets

APPARATUS AND METHOD FOR SYNCHRONIZING A SNAPSHOT IMAGE

CROSS-REFERENCE TO RELATED APPLICATION(S)

This application claims the benefit under 35 U.S.C. §119(a) of Korean Patent Application No. 10-2010-0056770, filed on Jun. 15, 2010, in the Korean Intellectual Property Office, the entire disclosure of which is incorporated herein by reference for all purposes.

BACKGROUND

1. Field

The following description relates to a technique for fast system booting based on snapshot images.

2. Description of the Related Art

Recently, a technique to suspend/resume a system based on a snapshot image has been utilized to reduce system booting time. A snapshot image includes metadata that contains the content of a physical memory as well as computing statuses. A snapshot image may be created and stored in a nonvolatile memory when a system is suspended so that when the system resumes, a task is resumed through the stored snapshot image from a point in time at which the system was suspended.

The system suspend/resume technique based on the snapshot image may reduce a system booting time by creating a snapshot image that includes a status of the system just after the system is booted and booting the system using the snapshot image.

However, the system suspend/resume technique has a problem in that a user has to intervene to create a snapshot image of a system and dump the entire system memory in order to maintain a latest status of the system. If a user restarts a system without synchronization of a snapshot image, for example, when installing a new program or changing system settings in a fast boot environment, information about the previously installed program and the changed system settings may disappear and the newly installed program or the changed program may not be accounted for upon reboot.

That is, although the program has been stored in a storage or the changed system settings have been recorded in a setting file, rebooting the system without synchronization of a snapshot image returns the content of a memory to a status before the program was installed or before the system settings were changed. This can cause inconsistency between information stored in the storage and information loaded onto the memory.

SUMMARY

In one general aspect, there is provided an electronic apparatus comprising a first storage to store status information related to an execution status of a system, a second storage to load some of the status information based on the execution of the system, when the system is booted, and a synchronization unit to detect, when a process changes the status information loaded onto the second storage, a synchronization page corresponding to the changed part and to reflect the synchronization page in the status information stored in the first storage.

The synchronization unit may determine whether the changed status information loaded onto the second storage from among the status information stored in the first storage has been generated based on a write fault of a page generated by execution of the process, and the synchronization unit may detect the synchronization page based on the result of the determination.

The synchronization unit may determine whether the process that has generated the write fault is a pre-defined process that is ready for synchronization and may detect the synchronization page based on the result of the determination.

The synchronization unit may synchronize the synchronization page in the status information stored in the first storage when the number of detected synchronization pages exceeds a threshold value.

The synchronization unit may synchronize the synchronization page in the first storage when the system enters an idle status.

The synchronization unit may synchronize the synchronization page in the status information stored in the first storage when a battery of the system is below a predetermined threshold value The electronic apparatus may further comprise a creator to create the status information.

When creating the status information, the creator may clear a page table of the process so that a page fault is generated when the process accesses the second storage.

The first storage may be a non-volatile memory or a disk and the second storage is a volatile memory.

In another aspect, there is provided a snapshot synchronization apparatus comprising a booting unit to boot a system based on status information related to an execution status of a system and stored in a disk of the system, a synchronization page detector to determine, after the system is booted, whether a change occurs in the status information loaded onto a memory of the system based on the execution of a process on the system, and to detect a synchronization page corresponding to any changed part of the status information based on the result of the determination, and a status information updating unit to reflect the detected synchronization page in the status information stored in a disk of the system.

The synchronization page detector may determine whether the status information loaded onto the memory of the system has been generated by a write fault of a page generated when a process on the system accesses the memory, and the synchronization unit may detect the synchronization page based on the result of the determination.

The synchronization page detector may determine whether the process that has generated the write fault is a pre-defined process that is ready for synchronization and may detect the synchronization page based on the result of the determination.

The status information updating unit may synchronize the synchronization page in the status information stored in the disk when the number of detected synchronization pages exceeds a threshold value.

The status information updating unit may synchronize the synchronization page in the status information stored in the disk when the system enters an idle status.

The status information updating unit may synchronize the synchronization page in the status information stored in the first storage when a battery of the system is below a predetermined threshold value.

In another aspect, there is provided a snapshot synchronization method comprising booting a system based on status information about an execution status of a system and stored in a disk of the system, determining, after the system is booted, whether a change occurs in the status information loaded onto a memory of the system based on the execution of a process on the system, and detecting a synchronization page corresponding to any changed part of the status information based on the result of the determination, and updating the status information stored in the disk of the system based on the synchronization page.

The detecting of the synchronization page may comprise determining whether the status information loaded onto the memory has been generated by a write fault of a page generated when a process on the system accesses the memory, and detecting the synchronization page based on the result of the determination.

The detecting of the synchronization page may comprise determining whether the process that has generated the write fault is a pre-defined process that is ready for synchronization and detecting the synchronization page based on the result of the determination.

The updating of the status information may comprise synchronizing the synchronization page in the status information stored in the disk when the number of detected synchronization pages exceeds a threshold value.

The updating of the status information may comprise synchronizing the synchronization page in the status information stored in the disk when the system enters an idle status.

The updating of the status information may comprise synchronizing the synchronization page in the status information stored in the first storage when a battery of the system is below a predetermined threshold value.

The snapshot synchronization method may further comprise, before the system is booted, clearing a page table related to the process before the status information is stored, so that a page fault is generated when the process accesses the memory, and storing status information related to an execution status of the system in the disk.

Other features and aspects may be apparent from the following description, the drawings, and the claims.

BRIEF DESCRIPTION OF THE DRAWINGS

Throughout the drawings and the description, unless otherwise described, the same drawing reference numerals should be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, descriptions of well-known functions and constructions may be omitted for increased clarity and conciseness.

Figure 1:
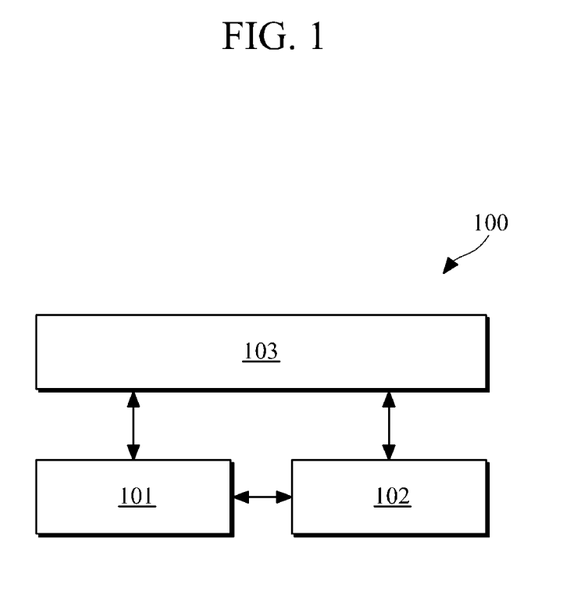
FIG. 1 is a diagram illustrating an example of an electronic apparatus.

FIG. 1 illustrates an example of an electronic apparatus. Referring to FIG. 1, electronic apparatus 100 may be, for example, a terminal, a computer, a mobile phone, a smart phone, an MP3 player, a PMP, a PDA, and the like. Also, the electronic apparatus 100 may be used to manage system booting in, for example, a computer, a mobile phone, a smart phone, an MP3 player, a PMP, a PDA, and the like.

Referring to FIG. 1, the electronic apparatus 100 includes a first storage 101, a second storage 102, and a synchronization unit 103.

The first storage 101 stores status information related to the execution status of the electronic apparatus 100. For example, the status information may include the execution status of the electronic apparatus at a specific point in time. For example, the status information may be a snapshot image that includes a status of memory just after the electronic apparatus 100 is booted. As another example, the status information may include a CPU register status of the electronic apparatus 100. As described herein, a snapshot, a snapshot image, or snapshot image data may be used to represent status information.

Accordingly, the electronic apparatus 100 may boot based on status information stored in the first storage 101, thus reducing an initial booting time. As an example, the first storage 101 may be a non-volatile memory or disk that does not lose status information stored therein when the electronic apparatus 100 is powered off. Examples of such a non-volatile memory or disk include a hard disk drive (HDD), a solid state drive (SSD), a flash memory, and the like.

The second storage 102 stores and maintains OS and application programs that were previously executed and/or that are in execution on the electronic apparatus 100 and data previously used and/or data currently being used by the electronic apparatus 100. For example, when the electronic apparatus 100 is booted based on status information stored in the first storage 101, some or all of the status information may be loaded onto the second storage 102. As another example, when a specific process is executed on the electronic apparatus 100 after booting, updated status information may be loaded onto the second storage 102. For example, the second storage 102 may be a volatile memory such as a random access memory (RAM) that a CPU of the electronic apparatus 100 may quickly access. Because the second storage 102 has loaded therein the initial status information of the electronic apparatus (or system) at boot-up, subsequent changes to the status information of the electronic apparatus (or system) may be reflected in the second storage 102.

The synchronization unit 103 updates the status information stored in the first storage 101 to reflect the current status of the electronic apparatus 100. In order to update status information stored in the first storage 101, the synchronization unit 103 may detect when a specific process of the electronic apparatus 100 changes status information loaded onto the second storage 102. Accordingly, the synchronization unit 103 may determine a synchronization page corresponding to the changed part of the status information and reflect the detected synchronization page in the status information stored in the first storage 101. That is, the synchronization unit 103 may detect when a specific process of the electronic apparatus 100 changes status information loaded onto the second storage 102, and the synchronization unit 103 may update boot information stored in the first storage 101 with updated status information stored in second storage 102.

For example, when status information stored in the first storage 101 is loaded onto the second storage 102, the synchronization unit 103 may determine whether the loading was caused by a page write fault generated by execution of a specific process. If the status information loaded onto the second storage was caused by a page write fault, the synchronization unit 103 may register the corresponding status information and its corresponding page as a candidate synchronization page. When the specific process having caused the page write fault is a process ready for a pre-defined synchronization, the synchronization unit 103 may detect the registered candidate synchronization page as a synchronization page.

Accordingly, the detected synchronization page may be reflected in the status information stored in the first storage 101. For example, the synchronization unit 103 may overwrite the detected synchronization page with the status information stored in the first storage 101.

The amount of time it takes for the synchronization unit 103 to synchronize the detected synchronization pages in status information stored in the first storage, may depend on the type of the electronic apparatus 100 or applications running on the electronic apparatus 100.

For example, when the number of detected synchronization pages ready for synchronization meets or exceeds a threshold value, the synchronization unit 103 may synchronize the detected synchronization pages. The threshold value may vary based on the type of the electronic apparatus 100 and/or applications running on the electronic apparatus 100.

As another example, when the electronic apparatus 100 enters into a specific status, for example, into an idle status or when the battery of the electronic apparatus 100 is below a certain threshold value, the synchronization unit 103 may synchronize the detected synchronization pages.

Accordingly, because the electronic apparatus 100 is booted based on status information stored in the first storage 101, an initial booting time may be reduced. In addition, because a specific part of the status information stored in the first storage 101 is automatically updated using the second storage 102 in combination with the synchronization unit 103, booting based on status information included in the first storage 101 may continue to be executed while representing latest system status of the electronic apparatus 100.

Figure 2:
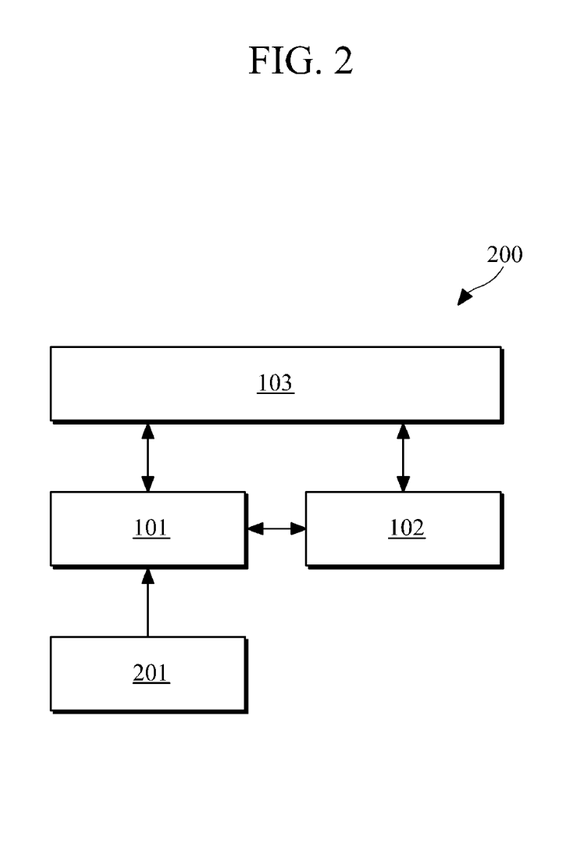
FIG. 2 is a diagram illustrating another example of an electronic apparatus.

FIG. 2 illustrates another example of an electronic apparatus.

Referring to FIG. 2, electronic apparatus 200 includes a first storage 101, a second storage 102, a synchronization unit 103, and a creator 201. The first storage 101, the second storage 102, and the synchronization unit 103 are described herein with reference to FIG. 1. Accordingly, further description is omitted.

The creator 201 may create status information that is to be stored in the first storage 101. For example, when the electronic apparatus 200 is booted, the creator 201 may create information about the execution status of the electronic apparatus 200, for example, information about the status of the second storage 102 and/or information corresponding to CPU register information of the electronic apparatus 200. As an example, the status information may be snapshot image data obtained by photographing the execution status of the system after the system is booted.

As another example, the creator 201 may create status information after clearing a page table related to a specific process to generate a page fault when the specific process accesses the second storage 102. For example, the creator may create a page fault by clearing the page table. For example, the creator 201 may clear a page table related to a specific process by setting a present bit of a page table entry to "0" or "1."

Accordingly, because page faults are generated upon the execution of a process after a system is booted based on status information, specific pages may be detected as pages to be synchronized based on the page faults, during run-time, without a user's intervention.

Figure 3:
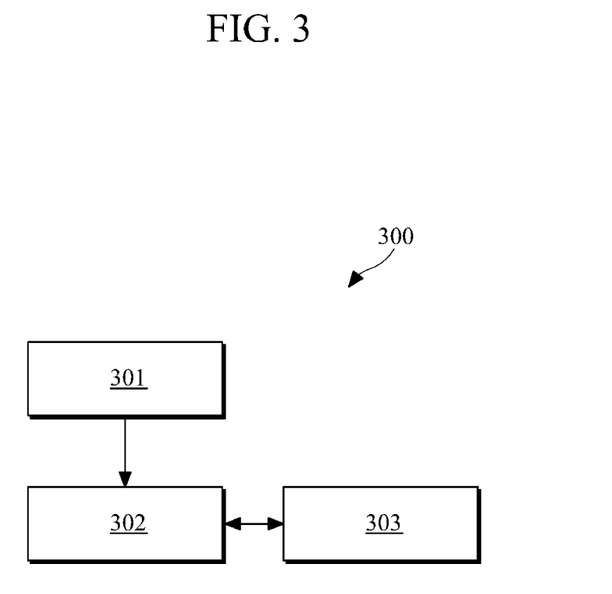
FIG. 3 is a diagram illustrating an example of a snapshot synchronization apparatus.

FIG. 3 illustrates an example of a snapshot synchronization apparatus. Snapshot is synchronization apparatus 300 is an example of the synchronization unit 103 illustrated in FIGS. 1 and 2.

Referring to FIG. 3, the snapshot synchronization apparatus 300 includes a booting unit 301, a synchronization page detector 302, and a status information updating unit 303.

The booting unit 301 may boot a system based on status information. For example, the status information may be a snapshot image related to the execution status of the system, a booting information image, and the like. The status information may be stored in a storage that may store data even when no power is supplied.

After the booting unit 301 boots the system, the synchronization page detector 302 determines whether a part of the status information loaded onto a memory of the system has changed based on the execution of a process on the system. The synchronization page detector 302 may detect a synchronization page that corresponds to a changed part of the status information, based on the result of the determination.

After system booting, status information may be loaded onto a system memory based on the execution of a certain process. As described with reference to FIG. 2, a page table may be updated so that all processes executed after booting induce page faults. Based on the page faults, status information may be loaded onto a system memory after system booting, for example, the memory may be the second storage 102 illustrated in FIG. 1.

For example, when a page fault is generated by a read operation of a certain process, that is, when a read fault is generated, the corresponding page in status information may be loaded onto memory, a present bit for the page in a page table may be changed, and a permission bit of the page table may be set to "read only." In this example, the page table may represent which frame of a memory each page of processes is stored in. Therefore, by clearing the page table of the respective page of the process, a page fault may be generated with respect to that process.

As another example, when a page fault is generated by an operation in which a certain process writes to the page, that is, when a write fault is generated, a permission bit of the corresponding page table may be set to "write enable" and the page may be registered as a candidate page ready for synchronization.

The page registered as the candidate page may be detected as a synchronization page, for example, based on the attributes of a process or task a related to the candidate page.

Figure 7:
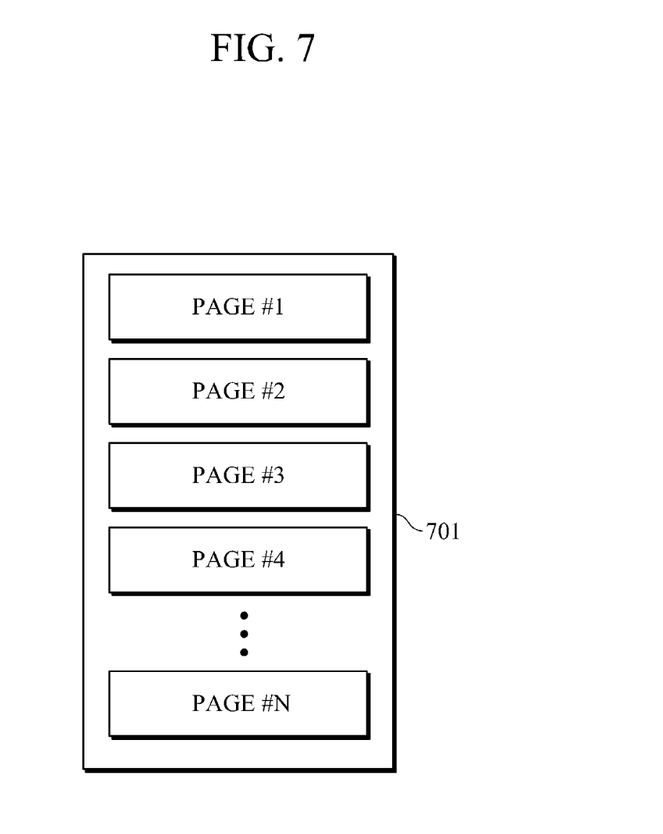
FIG. 7 is a diagram illustrating an example of a snapshot page.

For example, referring to FIG. 7, status information 701 may include a plurality of pages. FIG. 7 illustrates an example of a snapshot page. In this example, pages #1, #2, #3, #4, through # N are loaded onto a memory due to page faults generated by a read operation of a certain process. If write faults are also generated in the pages #1 and #2 from among the loaded pages #1, #2, #3, #4, through # N, the pages #1 and #2 may be selected as candidate synchronization pages.

Figure 8:
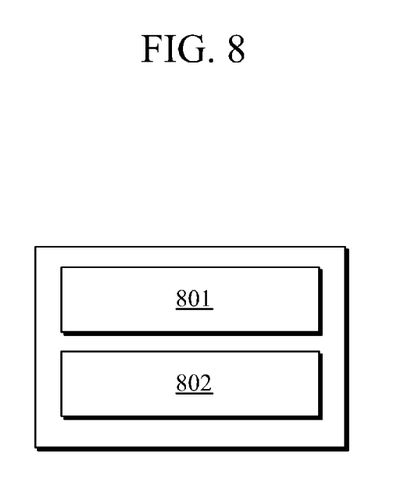
FIG. 8 is a diagram illustrating an example of a synchronization page detector.

FIG. 8 illustrates an example of a synchronization page detector. Referring to FIG. 8, the synchronization page detector, for example the synchronization detector 302 shown in FIG. 3, includes a task control block 801 that manages information for each task (or for each process) and page frame descriptor 802 that manages information of physical page frames.

For example, the page frame descriptor 802 may be provided in a one-to-one correspondence with physical pages and may represent which physical page belongs to which task. In the example of FIG. 7, the pages #1 and #2 selected as candidate synchronization pages may be identified as relating to a certain task or process by checking page frame descriptors of the pages #1 and #2.

The synchronization page detector 302 determines whether candidate pages relate to a task or process that is set for synchronization, which has been defined in advance, based on the page frame descriptor 802. For example, if the candidate pages relate to a task or process set for synchronization, the synchronization page detector 302 detects the candidate pages as synchronization pages. The task or process set for synchronization may be set based on a type of a system or applications. For example, processes which relate to system calls or continue to be executed in a background of a system may be set to a group of processes for synchronization.

Referring again to FIG. 3, when the synchronization page detector 302 detects synchronization pages based on the occurrence of write faults and the attributes of a process, the status information updating unit 303 reflects the detected synchronization pages by updating the status information.

The time at which the status information updating unit 303 updates status information may be set arbitrarily, for example, the status information updating unit 303 may synchronize detected synchronization pages if the number of the synchronization pages exceeds a predetermined threshold value. As another example, when the system enters a certain status, for example, when the system enters an idle status or when the battery of the system is below a certain threshold value, the status information updating unit 303 may synchronize the detected synchronization pages.

Figure 4:
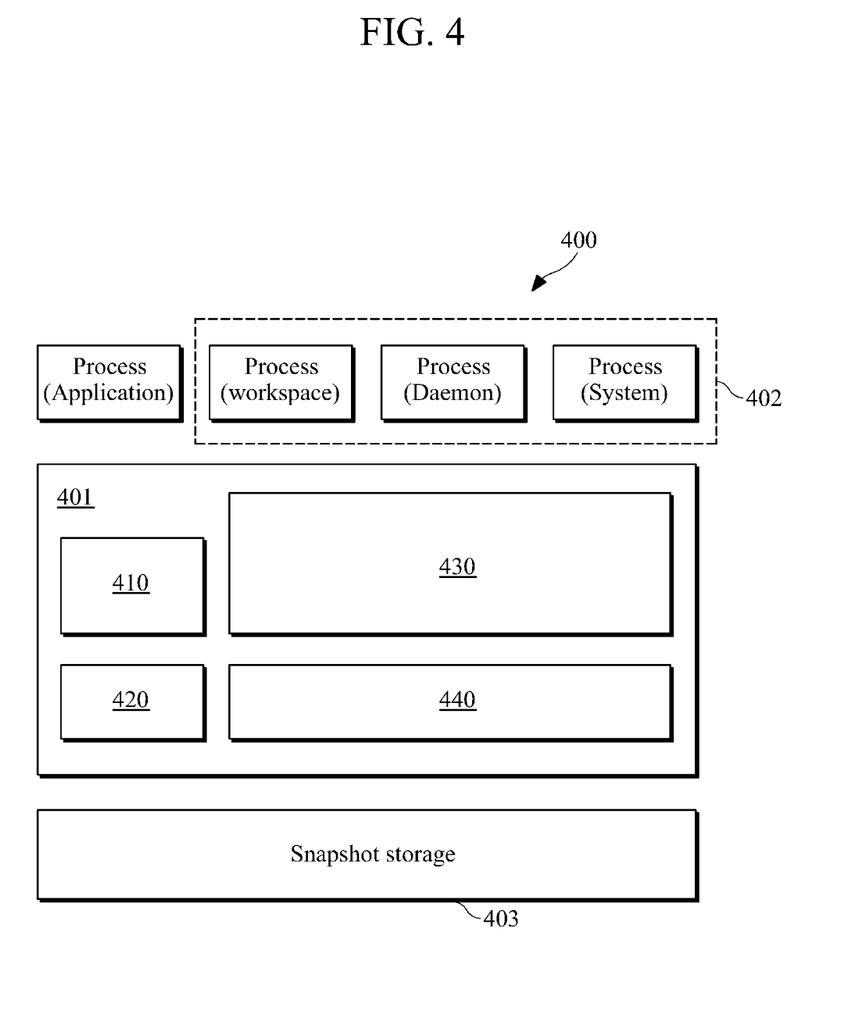
FIG. 4 is a diagram illustrating another example of a snapshot synchronization apparatus.

FIG. 4 illustrates another example of a snapshot synchronization apparatus. The example illustrated in FIG. 4 corresponds to the case where the snapshot synchronization apparatus 400 is implemented in an OS level.

Referring to FIG. 4, various kinds of processes operate in the upper layer of an OS kernel 401 and some of the processes may be grouped into a group 402 of processes ready for synchronization, based on their attributes. It should be apparent that processes set for synchronization may be decided based on a type of a system and/or its purpose of use.

In this example, a snapshot storage 403 that stores snapshot images is provided in the lower layer of the OS kernel 401. The snapshot images contain information about the execution status of the system. In this example, the snapshot synchronization apparatus 400 includes a page fault filter 410, a page fault handing module 420, a snapshot page group 430, and a snapshot page flush module 440

The snapshot synchronization apparatus 400 may be implemented in an OS level. For example, the snapshot synchronization apparatus 400 may be installed in the OS kernel 401. In this example, the page fault filter 410 is for detecting and collecting snapshot pages that have changed during a run time. The page fault handing module 420 is for selecting snapshot pages to be subject to synchronization from among the changed snapshot pages. The snapshot page group 430 is a group of snapshots ready for snapshot synchronization. The snapshot page flush module 440 is for synchronizing the snapshot pages that have changed during the run time with snapshot images.

Figure 5:
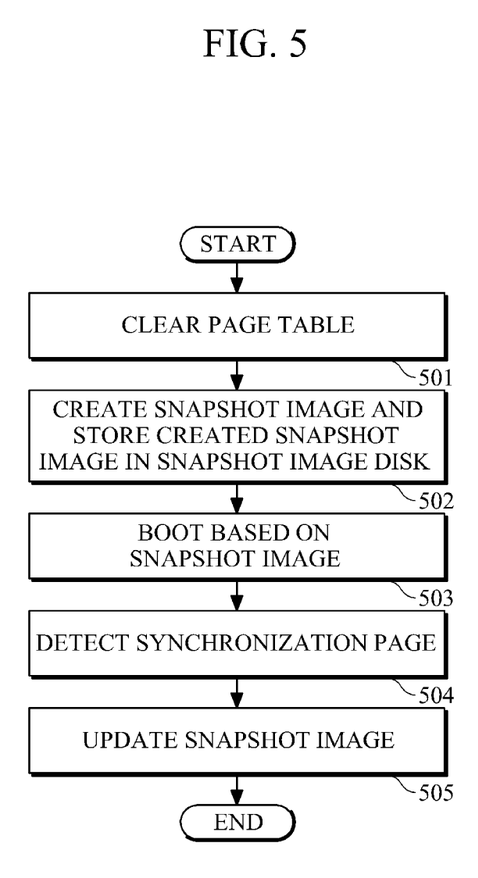
FIG. 5 is a flowchart illustrating an example of a snapshot synchronization method.

FIG. 5 illustrates an example of a snapshot synchronization method. For example, the snapshot synchronization method may be applied to a system environment illustrated in FIGS. 1 and 2. The snapshot synchronization method may include the features described with reference to FIGS. 1 through 4.

In 501, a page table related to processes is cleared so that a page fault may be generated and kept record of when a certain process accesses memory.

After the page table is cleared, a snapshot image is created and stored in a disk in 502. For example, the creator 201 shown in FIG. 2 may store a memory status and CPU register status just before a system is booted in the first storage 101.

After the snapshot image is created and stored, in 503 the system is booted based on the snapshot image. For example, the booting unit 301 may load pages of snapshot images stored in the first storage 101 onto the second storage 102 simultaneously, thereby quickly booting the system.

After the system is booted, in 504 synchronization pages set for synchronization during execution of a process are detected. For example, the synchronization page detector 302 may detect synchronization pages based on the occurrence of write faults and the attributes of the related process.

In 505, the detected synchronization pages are copied onto the snapshot image to update the snapshot image. For example, the status information updating unit 303 may compare the number of detected synchronization pages with a threshold value and may overwrite the detected synchronization pages with the snapshot image when the number of the synchronization pages exceeds the threshold value. As another example, the status information updating unit 303 may overwrite detected synchronization pages with the snapshot image when the system enters a certain state such as an idle status or when the battery of the system is below a certain threshold value.

Figure 6:
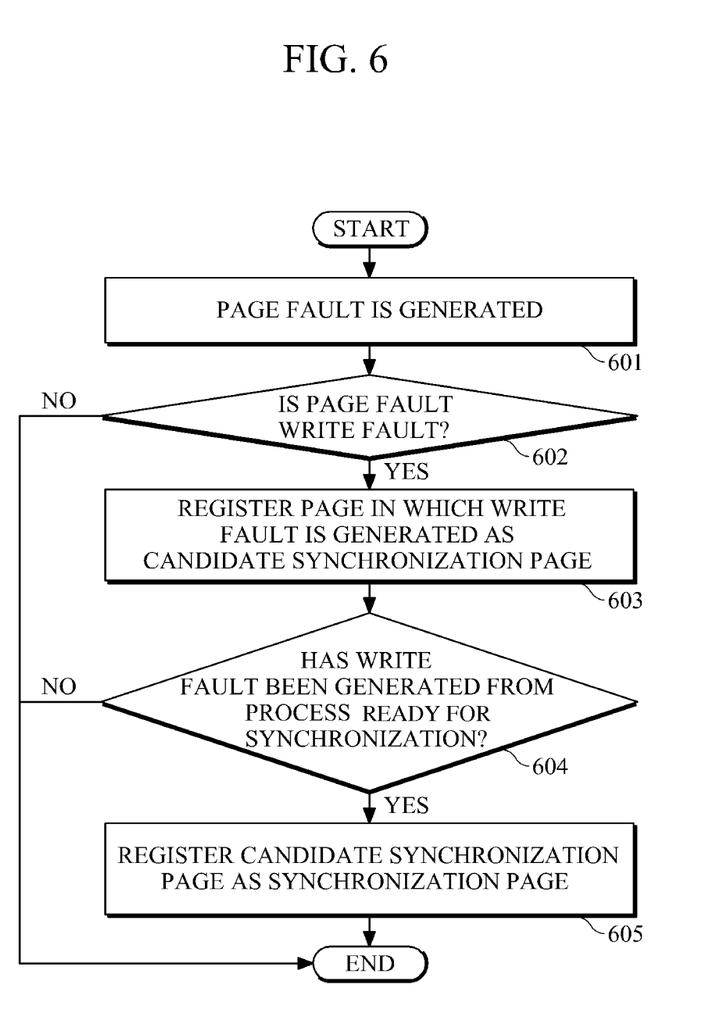
FIG. 6 is a flowchart illustrating an example of a method for detecting a synchronization page.

FIG. 6 illustrates an example of a method for detecting a synchronization page.

In the example of FIG. 6, when a page fault is generated in 601, it whether the page fault is a write fault is determined in 602. If the page fault is a read fault, no synchronization page is detected. If the page fault is a write fault, a page in which the write fault is generated is registered as a candidate synchronization page in 603.

Whether a process that has generated the write fault is a process ready for synchronization is determined in 604. If the process is a normal process, no synchronization page is detected. If the process is a process ready for synchronization, the candidate synchronization page is registered as a synchronization page in 605.

As described herein, the electronic apparatus includes multiple storage units, for example, a first storage unit and a second storage unit. The first storage unit may be a nonvolatile memory that is used to store initial boot information that includes status information used by the electronic apparatus when booting the electronic apparatus from an OFF state to an ON state. When the electronic apparatus is powered from an ON state to an OFF state, the first storage may be used to store a snapshot image of the current system status before powering off. The snapshot image may be used to represent the present status of the apparatus before powering down.

The second storage unit may be used to store changes to status information that occur once the electronic apparatus is powered on. For example, the second storage may refer to or may store the current status information of the system upon boot-up. Any changes made to the status information while the electronic apparatus is in operation, for example, changes made by a program that is newly installed, or changes by a program in operation, may be stored by the second storage and may be used to modify the status information initially loaded to the second storage at initial boot-up. As a result, changes to the status information of the apparatus may be reflected in the status information stored in the second storage.

A synchronization unit may determine whether a corresponding page stored in the first storage is ready for synchronization. For example, in order to update status information stored in the first storage 101, the synchronization unit 103 may detect when a specific process of the electronic apparatus 100 changes status information loaded onto the second storage 102. Accordingly, the synchronization unit 103 may determine a synchronization page corresponding to the changed part of the status information and synchronize the detected synchronization page in the status information stored in the first storage 101, and may update system status information stored on the first storage, with the synchronized pages, thus updating the initial status information.

Accordingly, using the multiple storages, initial boot information may be maintained using a first storage, and changes made once boot-up has occurred may be kept track of using the additional storage or storages. The synchronization unit may be used to detect changes to status information stored in the second storage and update pages of the initial boot information stored in the first storage based on the changed status information. As a result, the changes made during operation of the electronic apparatus may be kept track of and the initial boot information may be updated such that when the electronic apparatus is powered back on, the latest status information may be used to boot the system.

As a non-exhaustive illustration only, the apparatuses described herein may refer to mobile devices such as a cellular phone, a personal digital assistant (PDA), a digital camera, a portable game console, an MP3 player, a portable/personal multimedia player (PMP), a handheld e-book, a portable labtop personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

The processes, functions, methods and/or software described above may be recorded, stored, or fixed in one or more computer-readable storage media that include program instructions to be implemented by a computer to cause a processor to execute or perform the program instructions. The media may also include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as ROM, random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An electronic apparatus comprising:
a first storage to store status information related to an execution status of a system;
a second storage to load some of the status information based on the execution of the system, when the system is booted; and
a synchronization unit to detect, when a process changes the status information loaded onto the second storage, a synchronization page corresponding to the changed part and to reflect the synchronization page in the status information stored in the first storage.

2. The electronic apparatus of claim 1, wherein the synchronization unit determines whether the changed status information loaded onto the second storage from among the status information stored in the first storage has been generated based on a write fault of a page generated by execution of the process, and the synchronization unit detects the synchronization page based on the result of the determination.

3. The electronic apparatus of claim 2, wherein the synchronization unit determines whether the process that has generated the write fault is a pre-defined process that is ready for synchronization and detects the synchronization page based on the result of the determination.

4. The electronic apparatus of claim 1, wherein the synchronization unit synchronizes the synchronization page in the status information stored in the first storage when the number of detected synchronization pages exceeds a threshold value.

5. The electronic apparatus of claim 1, wherein the synchronization unit synchronizes the synchronization page in the first storage when the system enters an idle status.

6. The electronic apparatus of claim 1, wherein the synchronization unit synchronizes the synchronization page in the status information stored in the first storage when a battery of the system is below a predetermined threshold value.

7. The electronic apparatus of claim 1, further comprising a creator to create the status information.

8. The electronic apparatus of claim 7, wherein, when creating the status information, the creator clears a page table of the process so that a page fault is generated when the process accesses the second storage.

9. The electronic apparatus of claim 1, wherein the first storage is a non-volatile memory or a disk and the second storage is a volatile memory.

10. A snapshot synchronization apparatus comprising:
a booting unit to boot a system based on status information related to an execution status of a system and stored in a disk of the system;
a synchronization page detector to determine, after the system is booted, whether a change occurs in the status information loaded onto a memory of the system based on the execution of a process on the system, and to detect a synchronization page corresponding to any changed part of the status information based on the result of the determination; and
a status information updating unit to reflect the detected synchronization page in the status information stored in a disk of the system.

11. The snapshot synchronization apparatus of claim 10, wherein the synchronization page detector determines whether the status information loaded onto the memory of the system has been generated by a write fault of a page generated when a process on the system accesses the memory, and the synchronization unit detects the synchronization page based on the result of the determination.

12. The snapshot synchronization apparatus of claim 11, wherein the synchronization page detector determines whether the process that has generated the write fault is a pre-defined process that is ready for synchronization and detects the synchronization page based on the result of the determination.

13. The snapshot synchronization apparatus of claim 11, wherein the status information updating unit synchronizes the synchronization page in the status information stored in the disk when the number of detected synchronization pages exceeds a threshold value.

14. The snapshot synchronization apparatus of claim 11, wherein the status information updating unit synchronizes the synchronization page in the status information stored in the disk when the system enters an idle status.

15. The snapshot synchronization apparatus of claim 11, wherein the status information updating unit synchronizes the synchronization page in the status information stored in the first storage when a battery of the system is below a predetermined threshold value.

16. A snapshot synchronization method comprising:
booting a system based on status information about an execution status of a system and stored in a disk of the system;
determining, after the system is booted, whether a change occurs in the status information loaded onto a memory of the system based on the execution of a process on the system, and detecting a synchronization page corresponding to any changed part of the status information based on the result of the determination; and
updating the status information stored in the disk of the system based on the synchronization page.

17. The snapshot synchronization method of claim 16, wherein the detecting of the synchronization page comprises determining whether the status information loaded onto the memory has been generated by a write fault of a page generated when a process on the system accesses the memory, and detecting the synchronization page based on the result of the determination.

18. The snapshot synchronization method of claim 17, wherein the detecting of the synchronization page comprises determining whether the process that has generated the write fault is a pre-defined process that is ready for synchronization and detecting the synchronization page based on the result of the determination.

19. The snapshot synchronization method of claim 16, wherein the updating of the status information comprises synchronizes the synchronization page in the status information stored in the disk when the number of detected synchronization pages exceeds a threshold value.

20. The snapshot synchronization method of claim 16, wherein the updating of the status information comprises synchronizes the synchronization page in the status information stored in the disk when the system enters an idle status.

21. The snapshot synchronization method of claim 16, wherein the updating of the status information comprises synchronizes the synchronization page in the status information stored in the first storage when a battery of the system is below a predetermined threshold value.

22. The snapshot synchronization method of claim 16, further comprising:
before the system is booted, clearing a page table related to the process before the status information is stored, so that a page fault is generated when the process accesses the memory; and
storing status information related to an execution status of the system in the disk.

* * * * *